United States Patent Office 3,089,434
Patented May 14, 1963

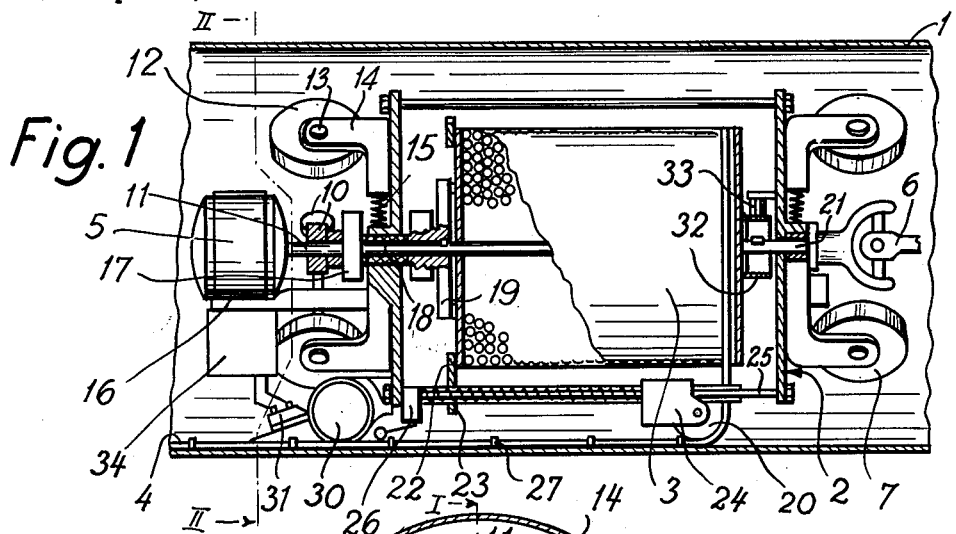
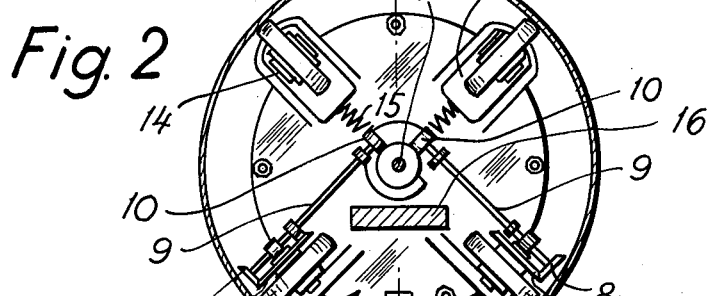
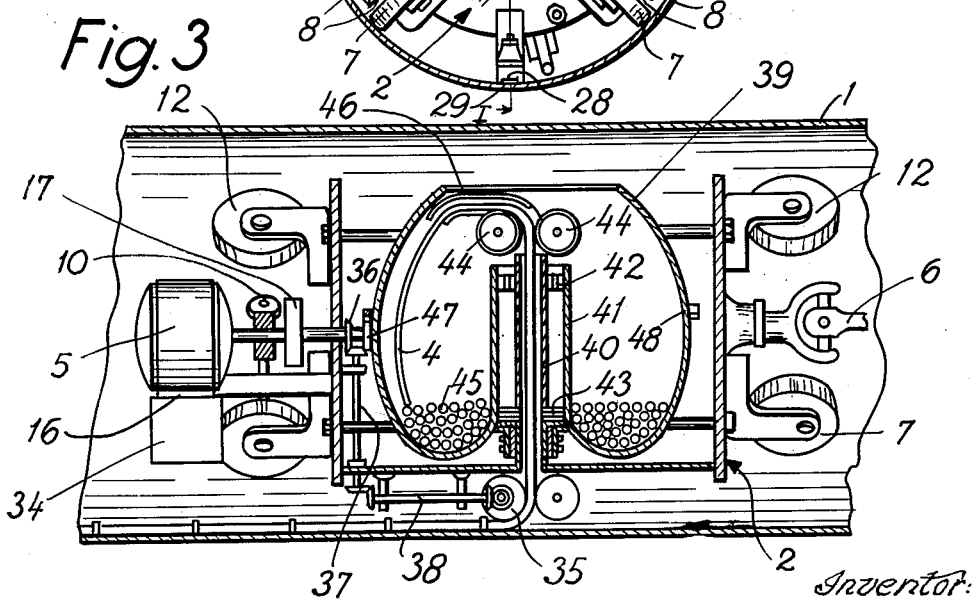

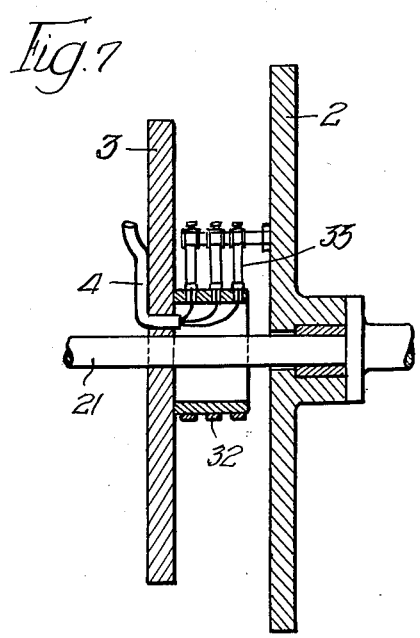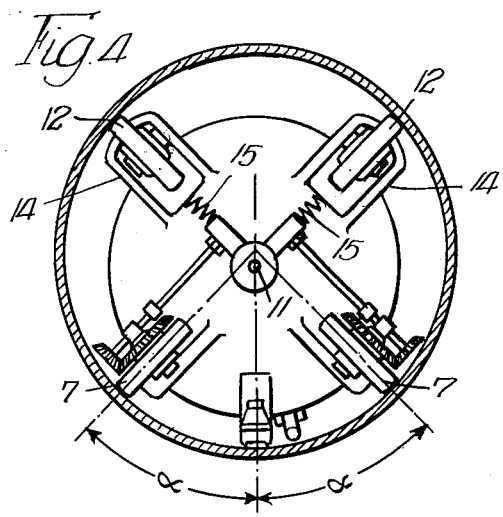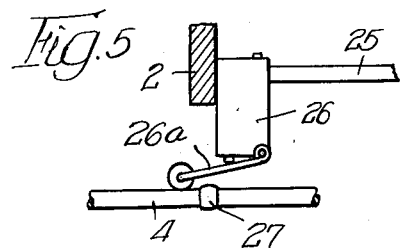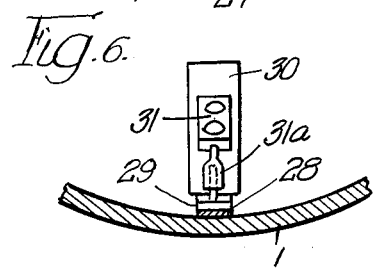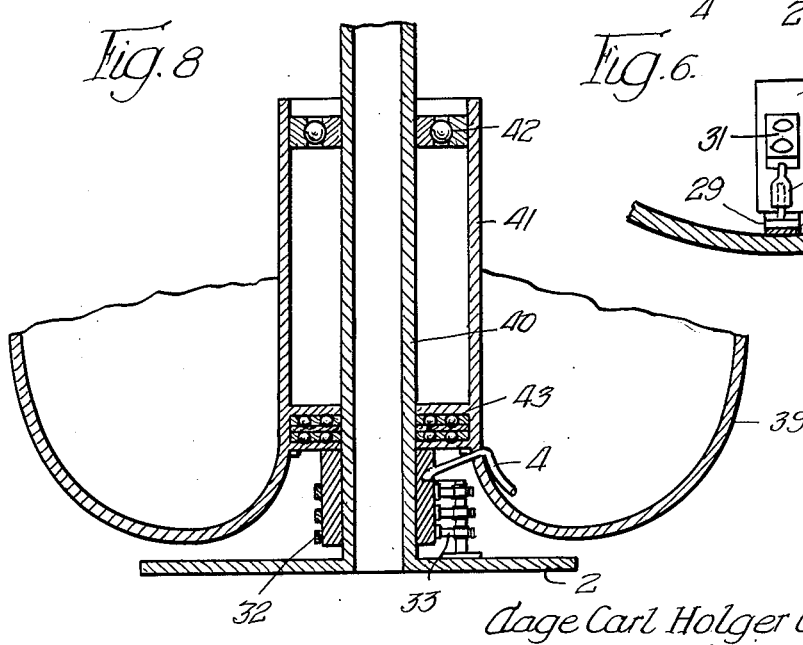

3,089,434
CONDUIT TRACTOR
Aage Carl Holger Andreasen, Islands Brygge 41,
Copenhagen, Denmark
Filed Sept. 22, 1958, Ser. No. 762,293
10 Claims. (Cl. 104—138)

The invention relates to a conduit tractor for laying and taking up a flexible rope, tube or cable in a pipeline, and particularly to a pipeline locomotive propelled by an electromotor or another known means of propulsion, the cable extending outwardly from one end of the pipeline.

In the construction or maintenance of pipelines, pipeline locomotives of the aforesaid kind have been employed, but the known locomotives suffer from a serious disadvantage in that the cables, such as the cable used for supplying power to the working machine or to the measuring apparatus involved, and to the motor of the pipeline locomotive, has to be dragged after the locomotive into the pipeline. This causes very heavy wear on the cables, wherefor these cables have had to be heavily reinforced. Reinforcing the cable increases the weight of the cable and renders it less convenient to handle. In addition comparatively powerful mechanisms are required for taking up the reinforced cable outwardly of the end of the pipeline. Furthermore, the pipeline locomotive has to have a considerable greater capacity to be able to drag the heavily reinforced cable into the pipeline than would otherwise be required.

The said aforesaid disadvantages are avoided in the instant invention, the essential feature of which is the cable is taken from or taken up into storing devices mounted on the pipeline locomotive while the latter is moving through the pipeline.

As a result, the cable is stationary in relation to the pipeline, whereby the wear on the cable is reduced quite considerably so that in most cases the cable need not be reinforced. This in turn means that the cable may be designed of reduced weight per unit of length. As a further result, the locomotive obtains a considerably larger range of action, since it has no friction to overcome between the cable and the inner side of the pipeline.

A further essential fetature of a pipeline locomotive of the instant invention, consists in cable storing devices mounted in the locomotive frame, and in driving and guiding devices, also mounted in the locomotive frame, for taking the cable from and taking up the cable into the storing devices while the locomotive is moving.

In one embodiment of the locomotive of the instant invention, the driving means carried in the locomotive frame consists of friction wheels driven by the locomotive, the said friction wheels resting in contact with the surface of the cable and hauling and guiding the cable when it is being taken from or taken up into the storing devices. As a result, the operations of reeling off and taking-up, support, respectively, the movement of the locomotive in the direction of laying and in the opposite direction, since the locomotive would have to develop a substantially larger forward propelling power if the locomotive were also required to pull the cable from the storing devices during the laying operation; further, the hauling in of the cable by the friction wheels during the take-up operation contributes to move the locomotive.

An essential feature of another embodiment of the locomotive of the instant invention, consists in rollers, guiding sleeves and similar guiding devices mounted in the locomotive frame in such manner that the cable is guided along its way between the inner side of the pipeline and the storing devices, which ensures that the cable is taken up in the storing devices in regular manner without developing kinks that might spoil the cable by excessive flexing or might give rise to difficulties in laying the cable.

In a suitable embodiment of the locomotive of the instant invention, the storing devices consist of a drum, a container or a frame which is mounted in the frame of the locomotive, and in a very suitable embodiment of the instant invention the drum, container or frame is rotatably mounted about a shaft in the locomotive frame.

In one embodiment of the locomotive of the instant invention, the drum, container or frame constitutes a part of the driving means carried by the locomotive frame and is mechanically coupled to the motive power of the locomotive and rotated by the said motive power, whereby a suitable adjustment of the rotation of the aforesaid parts in relation to the movement of the locomotive assures that the parts do not lay or take up the cable faster than corresponds to the movement of the locomotive.

The friction wheels, the drum, container or frame are in the instant invention preferably mechanically coupled to the motive power of the locomotive through a friction coupling. As a result, any difference between the length of cable laid or taken up and the movement of the locomotive may be equalized by sliding movement of the friction coupling.

In one embodiment of the locomotive of the instant invention, the drum, container or frame is provided with a set of coaxially disposed slip rings which are connected to the cores of the cable at the cable end innermost of the drum, container or frame, and which co-operate with carbon brushes provided on the frame, whereby an electrically secure connection is provided between the aforesaid devices and the electric devices of the locomotive mounted on the frame, such as the motor of the locomotive.

In one embodiment of the locomotive of the instant invention the shaft of the drum is located parallel to the direction of travel of the locomotive and placed below the bisection line between the planes of the two fixed wheels so that the common center of gravity of the drum and the frame falls within the acute angle between the said planes, and preferably is lying in the bisection plane between said planes, as a result of which the locomotive will by itself keep in such a position that its fixed wheels are lowermost in the cross-section of the pipeline.

In one embodiment of the locomotive of the instant invention, a guide roller for the cable is mounted in the locomotive frame along the path traversed by the cable on its way to the storing devices and inside the said acute angle. As a result, the cable is laid near the lowermost generatrix of the pipeline.

In one embodiment of the locomotive of the instant invention, the guide roller is displaceable parallel to the direction of the drum axis. As a result the cable taken up by the drum will be uniformly distributed over the drum surface.

In one embodiment of the locomotive of the instant invention, the guide roller is placed in a holder which holder is guided by rods attached to the frame and extending outside the end flanges of the drum. As a result, the cable is laid along a predetermined generatrix on the inner wall of the pipeline in relation to the driving wheels of the locomotive.

In one embodiment of the locomotive of the instant invention, the holder is mechanically coupled to the drum in such manner that it is moved to and fro along its guide rods during the rotation of the drum, as a result of which the cable can be laid in layers on the drum.

In one embodiment of the locomotive of the instant invention, there is an indicator in fixed connection with the locomotive frame to register the length of cable laid. As a result, the working machine passed into the pipeline can be brought to a standstill at predetermined positions defined by the length of cable laid.

In one embodiment of the locomotive of the instant invention, the indicator is provided with a mechanical or magnetic feeler co-operating with an electric switch and resting against the surface of the cable laid, the said feeler being employed to engage with projections, grooves or similar marks, equidistant or placed at predetermined points of the cable length. As a result, the movement of the locomotive through the pipeline can be controlled by the operators at the inlet end of the pipeline.

In one embodiment of the locomotive of the instant invention, the feeler of the indicator rests in contact with a measuring tape which during operation of the locomotive is attached to one end of the pipeline and is provided with projections, grooves, holes or similar marks, equidistant or placed at predetermined points. As a result, a very accurate localization of the locomotive and the working machine coupled to same is obtained.

In one embodiment of the locomotive of the instant invention, the measuring tape is so subjected to the action of a spring that the tape is self-reeling, whereby accurate registration of the position of the locomotive, both during the forward and the rearward travel of the locomotive, is obtained, the measuring tape being always kept taut by the spring.

In one embodiment of the locomotive of the instant invention the electric switch is incorporated in the electric circuit of the cable for transmission of a signal to a receiver placed at such end of the cable as is at the greater distance from the locomotive. As a result, the laying and the taking-up of the cable can be registered at the inlet end of the pipeline, and the movements of the locomotive are controlled in accordance with the registration.

The invention will now be described in detail with reference to the drawings, in which:

FIGURE 1 shows an embodiment of a pipeline locomotive for carrying the method of the instant invention into effect, the said locomotive, which is disposed in a pipeline, being viewed from the side in section on the line I—I of FIGURE 2;

FIGURE 2 is a view similar to FIGURE 1, but viewed in section on the line II—II of FIGURE 1;

FIGURE 3 is another embodiment of a pipeline locomotive according to the invention;

FIGURE 4 is a view similar to FIGURE 2, of a modified embodiment of the invention showing the drum shaft disposed below the intersection line of the planes of two fixed wheels of the locomotive;

FIGURE 5 is a fragmentary view, partly in elevation and partly in vertical section, of the indicator and its associated feeler, the latter for cooperation with the projections on the cable;

FIGURE 6 is a fragmentary view, partly in elevation and partly in vertical section, of a modified form of the invention, showing the feeler of the indicator cooperating with a measuring tape provided with the projections, in lieu of the cable being laid;

FIGURE 7 is a fragmentary view partly in elevation and partly in vertical section showing the slip rings and brushes connected to the cable; and FIGURE 8 is a view similar to FIGURE 1 of a modified form of the invention.

In the drawing, 1 denotes a pipeline, into which a pipeline locomotive has been introduced from one end of the pipeline. The said locomotive consists of a frame 2 carrying a drum 3 for a cable 4, for example, for supplying power to the electromotor 5 of the locomotive, and to a working machine or a measuring device (not shown) connected to same by means of a coupling link 6. The power cable 4 emanates from a source of current supply placed at one end of the pipeline, the said source not being shown. The frame 2 rests against the inner wall of the pipeline 1 by at least one pair of drive wheels 7 permanently attached to the frame. The drive wheels 7 are positioned adjacent to and connected to conical gearwheels 8, spindles 9, and gear wheels 10 coupled to a worm on the shaft 11 of the motor 5. The frame has, furthermore, at least one supporting wheel 12 which is radially displaceable in relation to the inner wall of the pipeline 1 during operation, the bearings 13 of the said wheel being, for example, placed in dovetail bearing blocks 14 which by springs 15 are urged in a direction outwardly towards the inner wall of the pipe, thus ensuring that the locomotive is not wedged in the pipeline if the inner wall should be uneven or the pipeline should vary substantially in diameter. The motor 5 is mounted on a bracket 16 and its shaft 11 is, through a gear box fixed to bracket 16. A sleeve 18, coupled to a friction coupling 19, is placed on the drum 3 and transmits the rotary movement of the motor to the drum, so that the cable 4 is constantly kept taut over a guiding roller 20, regardless of whether the drum is rotating one way or the other around its shaft 21.

When the locomotive is travelling within the pipeline, the gear box 17 may be disengaged by a clutch (not shown) so that the sleeve 18 is inoperative, whereby the friction coupling 19 brakes the laying of the cable.

Alternatively, the ratio of the gear box 17 may be such that when the locomotive is moving to the right in the drawing, that part of the friction coupling 19 which is attached to the sleeve 18 and is rotated by the motor 5, will move at a slower rate of speed than that part of the coupling 19 which is fixed to the drum 3, whereby the friction coupling likewise brakes the laying of the cable, whereas the friction coupling, when the locomotive moves to the left in the drawing, will impart such a rotary movement to the drum that the cable reeled is kept taut, even at the beginning of this operation when the diameter of the cable reel is smallest. It will thus be obvious to a person skilled in the art that in laying the cable the friction coupling 19 must be adapted to brake the drum 3, so that the cable is always stretched, and this may be accomplished by moving the part of the friction coupling 19, attached to the motor shaft at a higher rate of rotation than the drum. The shaft 21 of the drum may in a modified form of the invention be placed below the bisection line between the common planes of the two fixed wheels 7, and preferably so that the common center of gravity of the drum and the frame falls within the acute angle X—X between the said planes, which ensures that the weight of the drum and the frame keeps the said frame 20 pressed against the lowest part of the pipeline, and the guide roller 20 is preferably placed near said lowest part inside the said acute angle. The guide roller 20 is displaceable parallel with the direction of the drum axis and is mechanically coupled to the drum, so that the cable is reeled and unreeled regularly; for example, a gear rim 22 on one end flange of the drum may be in mesh with a gearwheel 23 which drives a threaded spindle in a known manner for reciprocation of the holder 24 of the guide roller, the said holder 24 being guided by rods 25 attached to the frame 2 and projecting preferably outwardly of the end flanges of the drum. The rods 25 are in a known manner provided with end stops for reversing the movement of the holder 24. These features are known. See Patent 951,955, FIGURE 3. The frame 2 may be provided with an indicator 26 (FIGURE 5) to register the length of cable laid and to check the movement of the locomotive, and the said indicator may consist of a mechanical or magnetic feeler 26a co-operating with an electric switch, such as a microswitch, and resting against the surface of the cable which is provided with projections, grooves or magnetic marks 27, equidistant or placed at predetermined points along the cable length. In another embodiment of the locomotive of the instant invention, the indicator may rest in contact with a measuring tape 28 (FIG. 6) which is provided with corresponding projections, grooves, holes or magnetic devices 29 and which during operation is attached at the inlet end of the pipeline. The measuring tape 28 is subject to the action of a spring so mounted in a container 30 that it is self-reeling. The electric switch 31 may be incorporated in an electric circuit in the cable 4 for transmission of a signal to a receiver (not shown), placed at such end of the cable as is at the greater distance from the locomotive. The projections, grooves, holes, or the magnetic devices 29 may be produced in or placed on the steel tape by means of a special stamping or embossing device in conformity with the distance from the inlet end of the pipe to those points in the pipeline which are to be treated by the working machine, or checked by the measuring device.

It will thus be understood that the locomotive disclosed above may be remotely controlled from the inlet end of the pipeline and be brought to a stand-still when the indicator signals that the feeler has reached a definite one of the marks placed on the cable or the measuring tape. The electric connection between the cable 4 and the electric devices, such as the motor 5 and the indicator 26 and the switch 31 is effected by means of a set of slip rings 32 mounted coaxially on the drum 3 and connected to the core of the cable 4 at the cable end attached innermost on the drum, the said slip rings 32 cooperating with contact brushes 33 mounted on the frame 2. The rotation of the motor 5 may be controlled by means of an electrical control box 34 remotely controlled through the cable 4.

FIGURE 3 shows another embodiment of the locomotive according to the invention, in which the driving means carried by the frame 2 consist of friction wheels 35 driven by the locomotive via a gear wheel 36 which is in fixed connection with the driven shaft of the gear 17 and thereby mechanically coupled over shafts 37 and 38 to the motor 5 of the locomotive. Said friction wheels resting in contact with the surface of the cable and pulling and guiding the cable 4 as it is taken from and taken up into the cable drum. A storing device for the cable may consist of a frame or a container 39 carrier by a vertical hollow shaft 40 which is placed in the frame 2, the tubular central part 41 of the container being guided in relation to the shaft 40 by means of bearings such as ball bearings 42, 43 of which the upper bearing 42 is a collar bearing and the lower bearing is a collar thrust bearing. At the upper end of the hollow shaft 40 there is provided guiding rollers 44 which guide the cable along its way to the insides of the container where it will be deposited by its weight into horizontal coils 45.

In the path of the cable from the guiding rollers 44 to the coils 45 there is inserted a suitably bent tube 46 which in the disclosed embodiment of the locomotive is in permanent connection with the shaft 40. The container 39 is caused to perform a rotary movement about the shaft 40 by means of co-operating gear wheel members 47, 48, of which one consists of a gear wheel 47 attached to the driven shaft of the gear 17, while the other one consists of a gear rim 48 attached along the circumference of the container. The frame or the container 39 may alternatively be permanently mounted in the frame 2 of the locomotive, and if so the tube 46 may be pivotable about the shaft 40 and be coupled to members (not shown) producing such pivotal movement.

The electric connection between the cable 4 and the electric members of the locomotive is in the embodiment disclosed in FIGURE 3 provided in the same manner as described in the foregoing with reference to FIGURES 1 and 2, for example by means of slip rings 32 and contact brushes 33 mounted on the movable and on the fixed parts, respectively, of the container.

It will be appreciated that even though the invention is described in the foregoing specification with reference to the drawing, its scope should not be limited to the embodiment disclosed, but exclusively be limited by the following claims.

What I claim and desire to secure by Letters Patent is:

1. A pipeline locomotive for operation through a tubular pipe and for laying and taking up a flexible cable, such as a power supply cable to the locomotive, and said cable emanating from a source of current supply located at one end of the pipeline, comprising a frame, a plurality of supporting rollers for said frame, radially disposed means for connecting said rollers to said frame, at least one of said rollers being yieldingly mounted in said frame in such a way that it is resiliently urged outwardly against the inner wall of the pipeline, and driving, guiding and storing means mounted in the locomotive for laying the cable from and taking up the cable into the storing means while the locomotive is in motion.

2. A locomotive as claimed in claim 1 wherein the rollers and guiding means are so placed in the frame that the cable is guided along its way between the inner side of the pipeline and the storing device.

3. A locomotive as claimed in claim 1 wherein the driving means is mechanically coupled to the motive power of the locomotive through a friction coupling.

4. A locomotive as claimed in claim 1, wherein the driving means is permanently supported in relation to the frame of the locomotive, and wherein at least one of the supporting rollers is yieldably mounted in said frame in such a way that it is resiliently urged outwardly against the inner wall of the pipeline, characterized in the employment of the drum, the shaft of the drum being disposed parallel with the direction of travel of the locomotive and being so placed in a dividing plane between the planes of two fixed rollers that the common gravity point of the drum and the frame falls near the top of or within the acute angle between the said planes.

5. A locomotive as claimed in claim 1 wherein a guiding roller for the cable is mounted in the locomotive frame in the path of the cable on its way to the storing devices and inside the said acute angle.

6. A locomotive as claimed in claim 1 wherein a guiding roller is placed in a holder which is guided by rods attached to the frame and projecting outside end flanges of the drum.

7. A locomotive as claimed in claim 1 wherein an indicator is provided with a feeler cooperating with an electric switch and resting against the surface of the cable laid, the said cable being provided with projections, grooves or similar marks which are equidistant or placed or formed at predetermined points along the cable length.

8. A locomotive as claimed in claim 7 wherein the feeler of the indicator rests against a measuring tape which during operation is attached to one end of the pipeline, said tape being provided with projections, grooves, holes or similar marks which are equidistant or placed or formed at predetermined points on the cable length.

9. A locomotive as claimed in claim 7 wherein the measuring tap is mounted in the container in the locomotive and is so subjected to the action of spring means that it is self-reeling.

10. A locomotive as claimed in claim 7 wherein an electric switch is mounted in said frame and is operable by the movement of said feeler, said switch being incorporated in an electric circuit in the cable for transmission of a signal to a receiver preferably of the registering electromotive type which is inserted in said electric circuit at the end of the cable most remote from the locomotive.

References Cited in the file of this patent

UNITED STATES PATENTS

| | | |
|---|---|---|
| 621,018 | Benjamin | Mar. 14, 1899 |
| 772,734 | Morgan | Oct. 18, 1904 |
| 798,389 | Booker | Aug. 29, 1905 |
| 951,955 | Lynch | Mar. 15, 1910 |